(12) United States Patent
Okuyama et al.

(10) Patent No.: US 11,035,995 B2
(45) Date of Patent: Jun. 15, 2021

(54) DISPLAY DEVICE

(71) Applicant: Japan Display Inc., Minato-ku (JP)

(72) Inventors: Kentaro Okuyama, Tokyo (JP); Yudai Numata, Tokyo (JP)

(73) Assignee: Japan Display Inc., Minato-ku (JP)

( * ) Notice: Subject to any disclaimer, the term of this patent is extended or adjusted under 35 U.S.C. 154(b) by 79 days.

(21) Appl. No.: 16/357,518

(22) Filed: Mar. 19, 2019

(65) Prior Publication Data

US 2019/0302343 A1 Oct. 3, 2019

(30) Foreign Application Priority Data

Mar. 27, 2018 (JP) .............................. JP2018-059854

(51) Int. Cl.
*F21V 8/00* (2006.01)
*G02F 1/1334* (2006.01)

(52) U.S. Cl.
CPC ......... *G02B 6/0046* (2013.01); *G02B 6/0055* (2013.01); *G02B 6/0083* (2013.01); *G02F 1/1334* (2013.01); *G02B 6/0073* (2013.01)

(58) Field of Classification Search
CPC ............ G02F 1/133615; G02B 6/0046; G02B 6/0028; G02B 6/0073; G02B 6/0083
See application file for complete search history.

(56) References Cited

U.S. PATENT DOCUMENTS

| | | | | |
|---|---|---|---|---|
| 6,229,585 B1* | 5/2001 | Yanagi | ............... | G02F 1/133615 349/158 |
| 9,983,437 B2 | 5/2018 | Okuyama | | |
| 2008/0043171 A1* | 2/2008 | Takahashi | .......... | G02F 1/133615 349/65 |
| 2010/0296268 A1* | 11/2010 | Fasham | ................ | G02B 6/0028 362/97.1 |
| 2011/0096261 A1 | 4/2011 | Kobayashi | | |
| 2011/0128471 A1* | 6/2011 | Suckling | ............... | G02B 6/0041 349/62 |
| 2011/0286238 A1* | 11/2011 | Kurata | ................. | G02B 6/0021 362/606 |
| 2015/0234237 A1* | 8/2015 | Hirai | ................. | G02F 1/133788 349/123 |
| 2015/0277028 A1* | 10/2015 | Nishii | .................. | G02B 6/0085 362/612 |
| 2016/0070047 A1 | 3/2016 | Okuyama et al. | | |
| 2016/0116768 A1 | 4/2016 | Okuyama et al. | | |
| 2016/0320666 A1 | 11/2016 | Kim et al. | | |

(Continued)

FOREIGN PATENT DOCUMENTS

| | | |
|---|---|---|
| JP | 2011-095407 | 5/2011 |
| JP | 2016-085452 | 5/2016 |
| JP | 2016-212390 | 12/2016 |

*Primary Examiner* — Michael H Caley
*Assistant Examiner* — Jonathan Y Jung
(74) *Attorney, Agent, or Firm* — Oblon, McClelland, Maier & Neustadt, L.L.P.

(57) ABSTRACT

According to one embodiment, a display device includes a first substrate, a second substrate opposed to the first substrate and including an end portion, a liquid crystal layer provided between the first substrate and the second substrate and including a polymer in a shape of a streak and a liquid crystal molecule, a light-emitting element having a light emitting portion opposed to the end portion, and a light guide located between the end portion and the light emitting portion.

9 Claims, 9 Drawing Sheets

(56) References Cited

U.S. PATENT DOCUMENTS

| | | |
|---|---|---|
| 2017/0219840 A1 | 8/2017 | Okuyama |
| 2017/0285420 A1 | 10/2017 | Okuyama et al. |
| 2018/0074356 A1 | 3/2018 | Okuyama |

* cited by examiner

DISPLAY DEVICE

CROSS-REFERENCE TO RELATED APPLICATIONS

This application is based upon and claims the benefit of priority from Japanese Patent Application No. 2018-059854, filed Mar. 27, 2018, the entire contents of which are incorporated herein by reference.

FIELD

Embodiments described herein relate generally to a display device.

BACKGROUND

Recently, various display devices have been proposed. In one example, a display device which comprises a color filter between a polymer dispersed liquid crystal layer and a reflective layer and realizes color display by using light reflected off the reflective layer is disclosed. In another example, a mirror-type display device which comprises a reflective layer on an upper substrate, provides a mirror function by the reflective layer and also provides a display function of displaying an image in an opening area of the reflective layer is disclosed.

On the other hand, various illumination devices using polymer dispersed liquid crystal capable of switching between a scattering state of scattering incident light and a transmitting state of transmitting incident light are proposed.

Incidentally, degradation of display quality needs to be suppressed in the display device using polymer dispersed liquid crystal.

DETAILED DESCRIPTION

In general, according to one embodiment, a display device comprises a first substrate, a second substrate opposed to the first substrate and including an end portion, a liquid crystal layer provided between the first substrate and the second substrate and including a polymer in a shape of a streak and a liquid crystal molecule, a light-emitting element having a light emitting portion opposed to the end portion, and a light guide located between the end portion and the light emitting portion.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated in the drawings schematically, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

Figure 1:
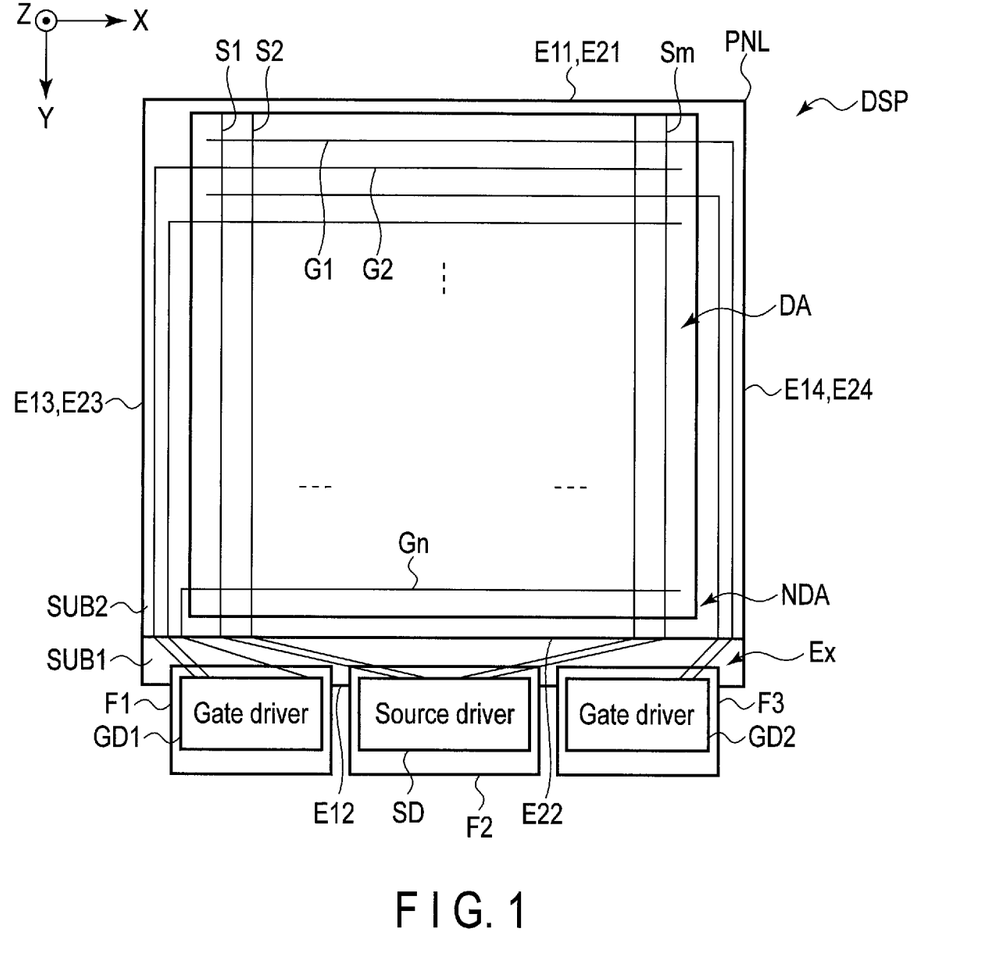
FIG. 1 is a plan view showing a configuration example of a display device DSP according to the present embodiment.

FIG. 1 is a plan view showing a configuration example of a display device DSP according to the present embodiment. A first direction X, a second direction Y and a third direction Z are orthogonal to each other in the drawing but may intersect at an angle other than 90 degrees. In the present specification, a position on the leading end side of an arrow indicating the third direction Z may be referred to as "above" and a position on the side opposite to the leading end of the arrow may be referred to as "below" in some cases. In the case of "a second member above a first member" and the case of "a second member below a first member", the second member may be in contact with the first member or may be away from the first member. In addition, an observation position at which the display device DSP is observed is assumed to be located on the leading end side of the arrow indicating the third direction Z, and a view from the observation position toward an X-Y plane defined by the first direction X and the second direction Y is referred to as planar view.

In the present embodiment, a display device employing polymer dispersed liquid crystal will be described as an example of the display device DSP. The display device DSP comprises a display panel PNL and wiring substrates F1 to F3. The display device DSP further comprises a light source unit (not shown).

The display panel PNL comprises a first substrate SUB1 and a second substrate SUB2. The first substrate SUB1 and the second substrate SUB2 are formed in the shape of a flat plate parallel to the X-Y plane. The first substrate SUB1 and the second substrate SUB2 overlap each other in planar view. The display panel PNL comprises a display area DA on which an image is displayed and a frame-shaped non-display area NDA which surrounds the display area DA. The display area DA is located in an area in which the first substrate SUB1 and the second substrate SUB2 overlap each other. The display panel PNL comprises n scanning lines G (G1 to Gn) and m signal lines S (S1 to Sm) in the display area DA. Each of n and m is a positive integer, and n may be equal to or different from m. The scanning lines G extend in the first direction X and are spaced apart and arranged in the second direction Y. The signal lines S extend in the second direction Y and are spaced apart and arranged in the first direction X.

The first substrate SUB1 comprises end portions E11 and E12 extending in the first direction X and end portions E13 and E14 extending in the second direction Y. The second substrate SUB2 comprises end portions E21 and E22 extending in the first direction X and end portions E23 and E24 extending in the second direction Y. In the example illustrated, the end portions E11 and E21, the end portions E13 and E23, and the end portions E14 and E24 overlap, respectively, in planar view. However, these end portions do not necessarily overlap. The end portion E22 is located between the end portion E12 and the display area DA in planar view. The first substrate SUB1 comprises an extension portion Ex between the end portion E12 and the end portion E22.

The wiring substrates F1 to F3 are connected to the extension portion Ex and are arranged in this order in the first direction X. The wiring substrate F1 comprises a gate driver GD1. The wiring substrate F2 comprises a source driver SD. The wiring substrate F3 comprises a gate driver GD2. The wiring substrates F1 to F3 may be replaced with a single wiring substrate.

The signal lines S are drawn to the non-display area NDA and are connected to the source driver SD. The scanning lines G are drawn to the non-display area NDA and are connected to the gate drivers GD1 and GD2. In the example illustrated, odd-numbered scanning lines G are drawn between the end portion E14 and the display area DA and are connected to the gate driver GD2. In addition, even-numbered scanning lines G are drawn between the end portion E13 and the display area DA and are connected to the gate driver GD1. The relationship in connection between the gate drivers GD1 and GD2 and the scanning lines G is not limited to the example illustrated.

Figure 2:
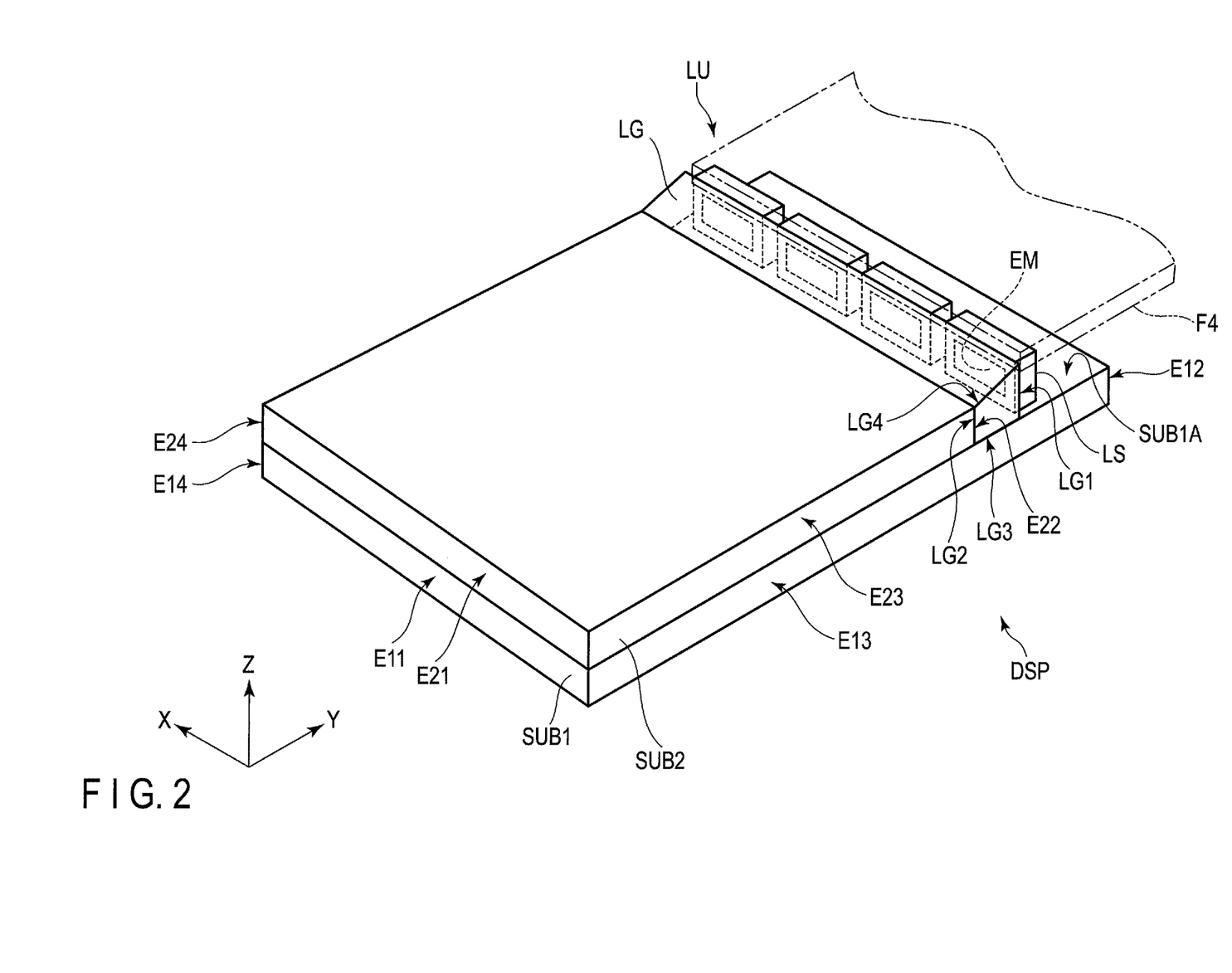
FIG. 2 is a perspective view showing the display device DSP shown in FIG. 1.

FIG. 2 is a perspective view showing the display device DSP shown in FIG. 1. Illustration of the wiring substrates F1 to F3 is omitted. A light source unit LU is located on the first substrate SUB1 and is disposed along the end portion E22. The light source unit LU comprises light-emitting elements LS corresponding to light sources and a wiring substrate F4 shown by a two-dot chain line. The light-emitting elements LS are spaced apart and arranged in the first direction X. Each of the light-emitting elements LS is connected to the wiring substrate F4. The light-emitting elements LS are located between the first substrate SUB1 and the wiring substrate F4. The wiring substrate F4 may be located between the first substrate SUB1 and the light-emitting elements LS. The light-emitting elements LS are, for example, light-emitting diodes (LEDs). Each of the light-emitting elements LS comprises a light emitting portion EM opposed to the end portion E22. Although not described in detail, the light emitting portion EM comprises a red light emitting portion, a green light emitting portion and a blue light emitting portion. The light emitting portion EM may comprise a cyan light emitting portion, a magenta light emitting portion and a yellow light emitting portion. These light emitting portions are provided in the light emitting portion EM shown by a dotted line in FIG. 2. However, these light emitting portions are not necessarily located in line in the first direction X. That is, these light emitting portions may be provided at different heights in the third direction Z from the first substrate SUB1.

A light guide LG is located between the second substrate SUB2 and the light-emitting elements LS. In the example illustrated, the second substrate SUB2, the light guide LG and the light-emitting elements LS are arranged in this order in the second direction Y. In addition, the second substrate SUB2, the light guide LG and the light-emitting elements LS are located on an upper surface SUB1A side of the first substrate SUB1.

The light guide LG has the function of guiding the light emitted from the light emitting portions EM to the end portion E22. The light guide LG has the shape of a rectangular prism extending in the first direction X. That is, the light guide LG has a first surface LG1 opposed to the light emitting portions EM and a second surface LG2 opposed to the end portion E22. The first surface LG1 and the second surface LG2 are parallel to each other. For example, each of the first surface LG1 and the second surface LG2 is a flat surface parallel to an X-Z plane defined by the first direction X and the third direction Z. As will be described later, a first height of the first surface LG1 is greater than a second height of the second surface LG2.

The light guide LG further has a third surface LG3 and a fourth surface LG4 between the first surface LG1 and the second surface LG2. The third surface LG3 is opposed to the first substrate SUB1 and is, for example, a flat surface parallel to the X-Y plane. The fourth surface LG4 is located on the side opposite to the third surface LG3 and is inclined with respect to the third surface LG3. That is, the fourth surface LG4 is a flat surface intersecting the first direction X, the second direction Y and the third direction Z.

Figure 3:
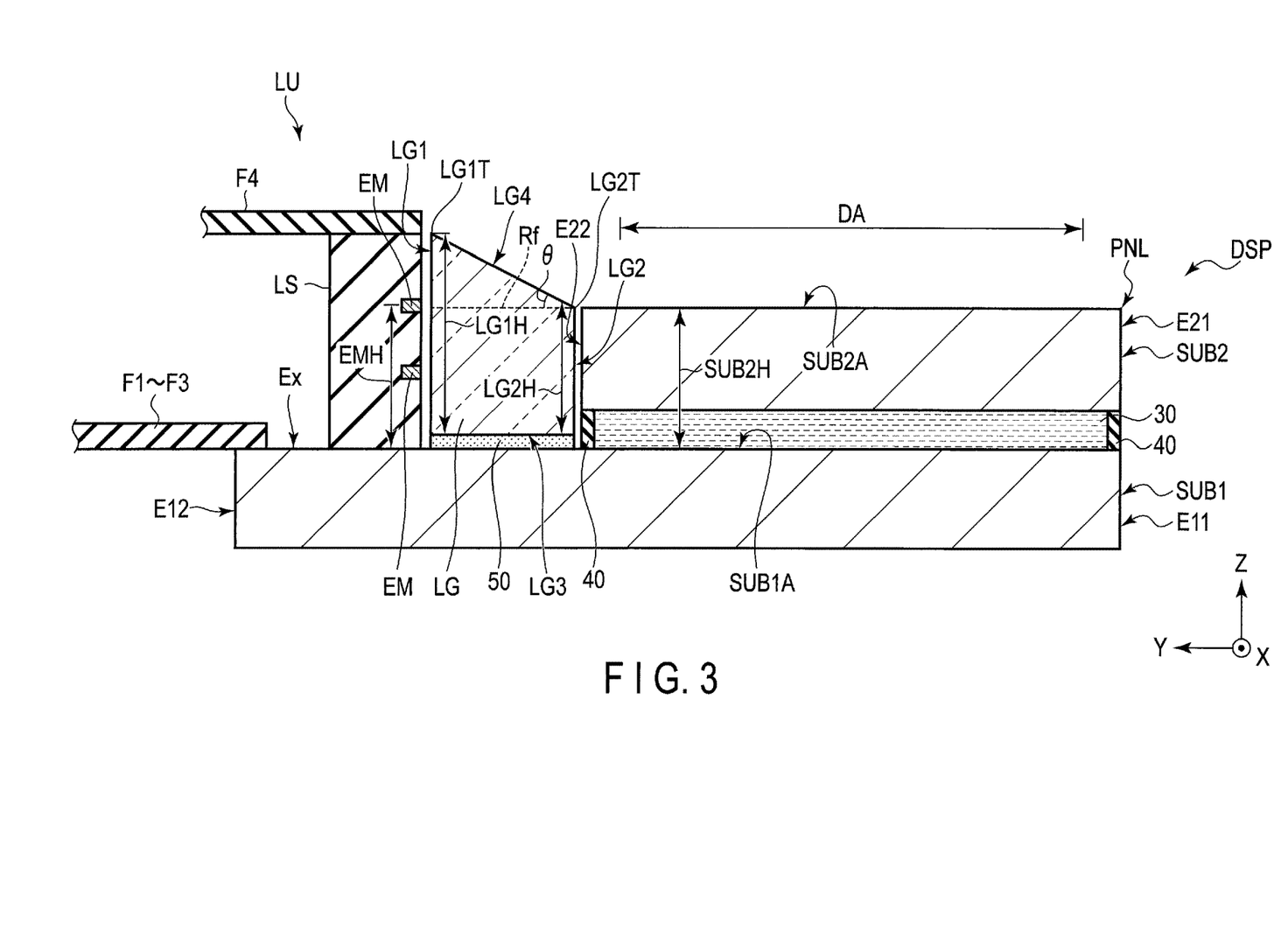
FIG. 3 is a cross-sectional view showing the display device DSP shown in FIG. 1.

FIG. 3 is a cross-sectional view showing the display device DSP shown in FIG. 1. Only main portions in the cross-section of the display device DSP in a Y-Z plane defined by the second direction Y and the third direction Z will be described. The display panel PNL comprises a liquid crystal layer 30 held between the first substrate SUB1 and the second substrate SUB2. The first substrate SUB1 and the second substrate SUB2 are bonded together by a sealant 40. The first substrate SUB1 has an upper surface SUB1A opposed to the second substrate SUB2. The second substrate SUB2 has an upper surface SUB2 on the side opposite to the liquid crystal layer 30. The upper surface USB2A is located at a height SUB2H from the upper surface SUB1A. A height in the present specification is assumed to be a length or distance in the third direction Z (in the direction of the normal to the first substrate SUB1).

In the example illustrated, the light-emitting element LS and the light guide LG are located on the extension portion Ex. In addition, the light-emitting element LS is located between the wiring substrates F1 to F3 and the light guide LG. In the light-emitting element LS, a light emitting portion EM which is the most distant in the third direction Z from the upper surface SUB1A is located at a height EMH from the upper surface SUB1A. The height EMH may be substantially equal to the height SUB2H or may be greater than the height SUB2H. That is, the light emitting portion EM located at the highest position among the light emitting portions EM included in the light-emitting element LS may be located near the upper surface USB2A.

The light-emitting element LS emits light from the light emitting portion EM toward the end portion E22 via the light guide LG. The light made incident from the end portion E22 propagates through the display panel PNL in the direction opposite to an arrow indicating the second direction Y as will be described later. The light-emitting element LS may be opposed to the end portions of both of the first substrate SUB1 and the second substrate SUB2 and may be opposed to, for example, the end portions E11 and E21.

The light guide LG is bonded to the first substrate SUB1, for example, via an adhesive layer 50 located between the third surface LG3 and the upper surface SUB1A. In addition, the light guide LG may be bonded to the wiring substrate F4 via an adhesive layer located between the fourth surface LG4 and the wiring substrate F4 as will be described later. The first surface LG1 has a first height LG1H. The second surface LG2 has a second height LG2H. The first height LG1H is greater than the second height LG2H. An upper end portion LG1T of the first surface LG1 is located at a position higher than that of an upper end portion LG2T of the second surface LG2. In addition, the upper end portion LG1T is located at a height greater than the height EMH. From the perspective of light incidence efficiency, the upper end portion LG1T should preferably be located within a range where the upper end portion LG1T is located at a height not less than the height EMH. The upper end portion LG2T is located at a height substantially equal to that of the upper surface SUB2A. The upper end portion LG2T should preferably be located at a position lower than the upper surface SUB2A. In the example illustrated, the third surface LG3 orthogonally intersects the first surface LG1 and the second surface LG2.

The fourth surface LG4 extends at a substantially constant inclination in the second direction Y from the first surface LG1 to the second surface LG2. A reference surface Rf which passes through the upper end portion LG2T and extends parallel to the third surface LG3 is shown by a dotted line in the drawing. An angle θ formed between the fourth surface LG4 and the reference surface Rf is an acute angle, for example, an angle less than 60°, more preferably, an angle less than 30°. From the perspective of light incidence efficiency, the angel θ should preferably be less than or equal to 15°.

The light guide LG is away from the light-emitting element LS in the example illustrated, but the light guide LG may be in contact with the light-emitting element LS. In addition, the light guide LG is away from the second substrate SUB2 in the example illustrated, but the light guide LG may be in contact with the second substrate SUB2. Air layers should preferably be interposed between the light-emitting element LS and the light guide LG and between the light guide LG and the second substrate SUB2, respectively. The light guide LG is formed of, for example, transparent resin such as polymethyl methacrylate (PMMA) or polycarbonate, transparent glass or the like.

Figure 4:
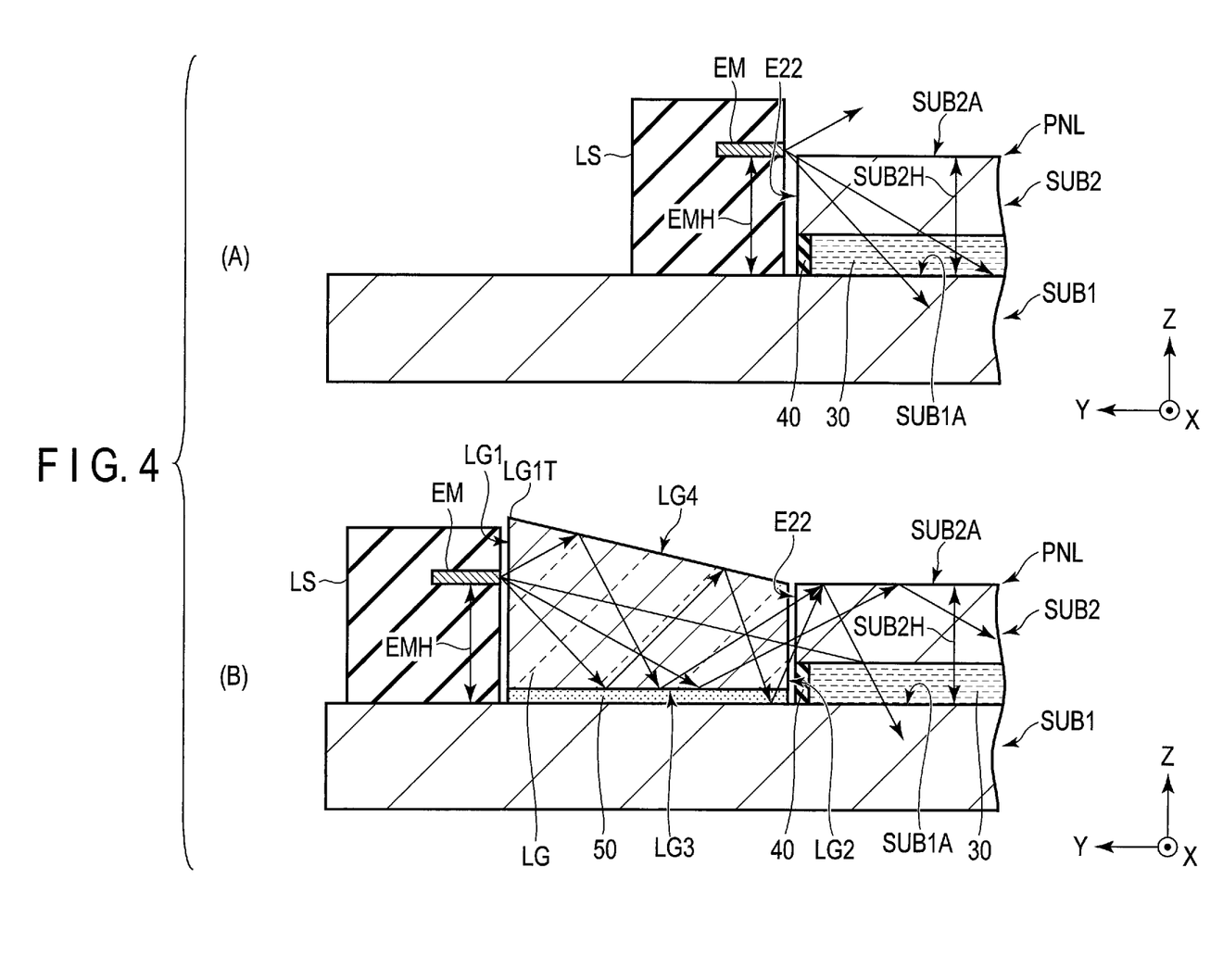
FIG. 4 is a schematic view showing the way the light propagates in the display device DSP of the present embodiment.

FIG. 4 is a schematic view showing the way the light propagates in the display device DSP of the present embodiment.

FIG. 4 (A) corresponds to a comparative example in which no light guide is disposed between the light-emitting element LS and the second substrate SUB2. If the height EMH from the upper surface SUB1A to the light emitting portion EM is substantially equal to the height SUB2H from the upper surface SUB1A to the upper surface SUB2A or the height EMH is greater than the height SUB2H, part of the light emitted from the light emitting portion EM is not made incident on the end portion E22 and does not contribute to the display on the display panel PNL. Therefore, the light incidence efficiency of the light from the light source unit LU to the display panel PNL decreases, and the display quality may be degraded.

FIG. 4 (B) corresponds to the display device DSP of the present embodiment, and the light guide LG is provided between the light emitting portion EM and the end portion E22. The light guide LG comprises a first surface LG1 having the upper end portion LG1T located at a height greater than the height EMH. The fourth surface LG4 is in contact with an air layer. For this reason, the light emitted from the light emitting portion EM is made incident on the light guide LG, propagates through the light guide LG while being reflected off the third surface LG3 and the fourth surface LG4, and is made incident on the display panel PNL from the end portion E22. Accordingly, most of the light emitted from the light emitting portion EM is guided to the end portion E22 and contributes to the display on the display panel PNL. Therefore, the decrease of light incidence efficiency can be suppressed, and the degradation of display quality can be suppressed.

Furthermore, in the comparative example, if the thickness of the second substrate SUB2 is increased for improving the light incidence efficiency, this will hinder the reduction of the thickness of the display panel PNL and will increase the weight of the display device DSP. On the other hand, according to the present embodiment, the decrease of the light incidence efficiency can be suppressed without the increase of the thickness of the second substrate SUB2. In addition, even if the height of the light emitting portion EM varies, the upper end portion LG1T is located at a position sufficiently higher than the light emitting portion EM located at the highest position, and the decrease of the light incidence efficiency can be suppressed.

Next, a configuration example of the display panel PNL will be described.

Figure 5:
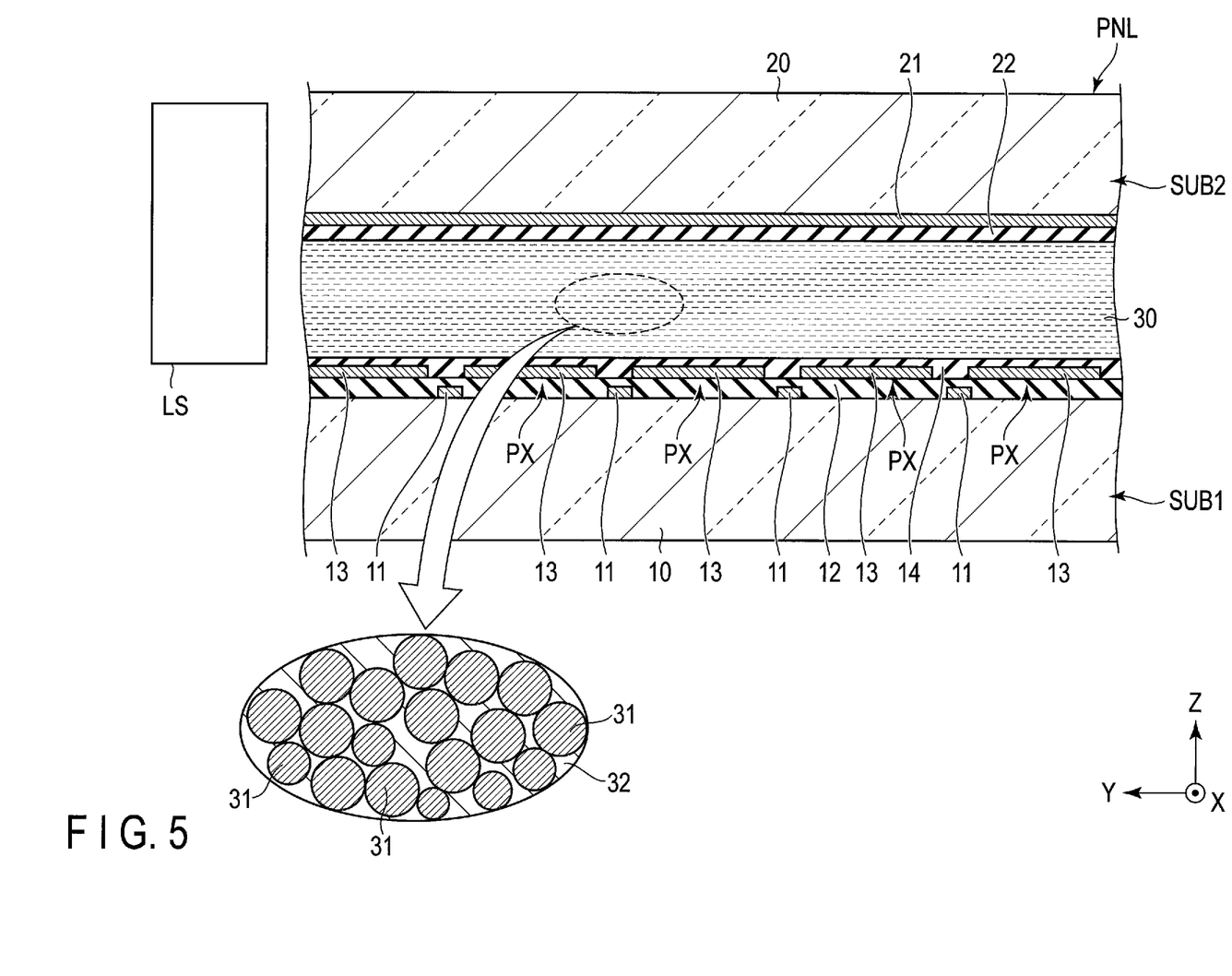
FIG. 5 is a cross-sectional view showing a configuration example of the display panel PNL shown in FIG. 3.

FIG. 5 is a cross-sectional view showing a configuration example of the display panel PNL shown in FIG. 3. The first substrate SUB1 comprises a transparent substrate 10, wiring lines 11, an insulating layer 12, pixel electrodes 13 and an alignment film 14. The second substrate SUB2 comprises a transparent substrate 20, a common electrode 21 and an alignment film 22. The transparent substrates 10 and 20 are insulating substrates such as glass substrates or plastic substrates. The wiring lines 11 are formed of a nontransparent metal material such as molybdenum, tungsten, aluminum, titanium or silver. The illustrated wiring lines 11 extend in the first direction X but may extend in the second direction Y. The insulating layer 12 is formed of a transparent insulating material. The pixel electrodes 13 and the common electrode 21 are formed of a transparent conductive material such as indium tin oxide (ITO) or indium zinc oxide (IZO). The pixel electrodes 13 are disposed in the respective pixels PX. The common electrode 21 is disposed across the pixels PX. The alignment films 14 and 22 may be horizontal alignment films having an alignment restriction force substantially parallel to the X-Y plane or may be vertical alignment films having an alignment restriction force substantially parallel to the third direction Z.

The liquid crystal layer 30 is located between the alignment film 14 and the alignment film 22. The liquid crystal layer 30 comprises polymer dispersed liquid crystal which includes polymers 31 and liquid crystal molecules 32. For example, the polymers 31 are liquid crystal polymers. The polymers can be obtained by, for example, polymerizing liquid crystal monomers in the state of being aligned in a predetermined direction by the alignment restriction force of the alignment films 14 and 22. For example, the alignment treatment direction of the alignment films 14 and 22 is the first direction X, and the alignment films 14 and 22 have an alignment restriction force in the first direction X. For this reason, the polymers 31 are formed in the shape of a streak extending in the first direction X. The liquid crystal molecules 32 are dispersed in the gaps between the polymers 31 and are aligned such that major axes thereof extend in the first direction X.

The polymers 31 and the liquid crystal molecules 32 have optical anisotropy or refractive anisotropy. The liquid crystal molecules 32 may be positive liquid crystal molecules having positive dielectric anisotropy or may be negative liquid crystal molecules having negative dielectric anisotropy. The polymers 31 and the liquid crystal molecules 32 have different responsivities to an electric field. The responsivity of the polymers 31 to an electric field is lower than the responsivity of the liquid crystal molecules 32 to an electric field. In the enlarged portion in the drawing, the polymers 31 are shown by upward diagonal lines and the liquid crystal molecules 32 are shown by downward diagonal lines.

Figure 6:
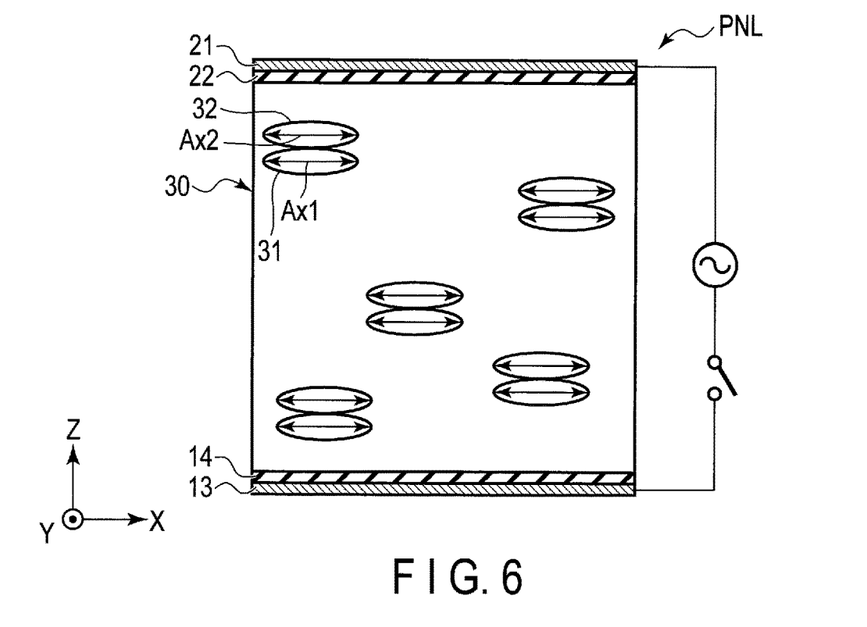
FIG. 6 is a schematic view showing a liquid crystal layer 30 in an off state.

FIG. 6 is a schematic view showing the liquid crystal layer 30 in an off state. The drawing shows a cross-section of the liquid crystal layer 30 in the X-Z plane intersecting the second direction Y which is the traveling direction of the light from the light source unit LU. The off state corresponds to a state in which no voltage is applied to the liquid crystal layer 30 (for example, a state in which the potential difference between the pixel electrode 13 and the common electrode 21 is approximately zero). An optical axis Ax1 of the polymer 31 and an optical axis Ax2 of the liquid crystal molecule 32 are parallel to each other. In the example illustrated, the optical axis Ax1 and the optical axis Ax2 are parallel to the first direction X. The polymer 31 and the liquid crystal molecule 32 have substantially equal refractive anisotropy. That is, the ordinary refractive index of the polymer 31 and the ordinary refractive index of the liquid crystal molecule 32 are substantially equal to each other, and the extraordinary refractive index of the polymer 31 and the extraordinary refractive index of the liquid crystal molecule 32 are substantially equal to each other. For this reason, hardly any refractive index difference exists between the polymer 31 and the liquid crystal molecule 32 in all directions including the first direction X, the second direction Y and the third direction Z.

Figure 7:
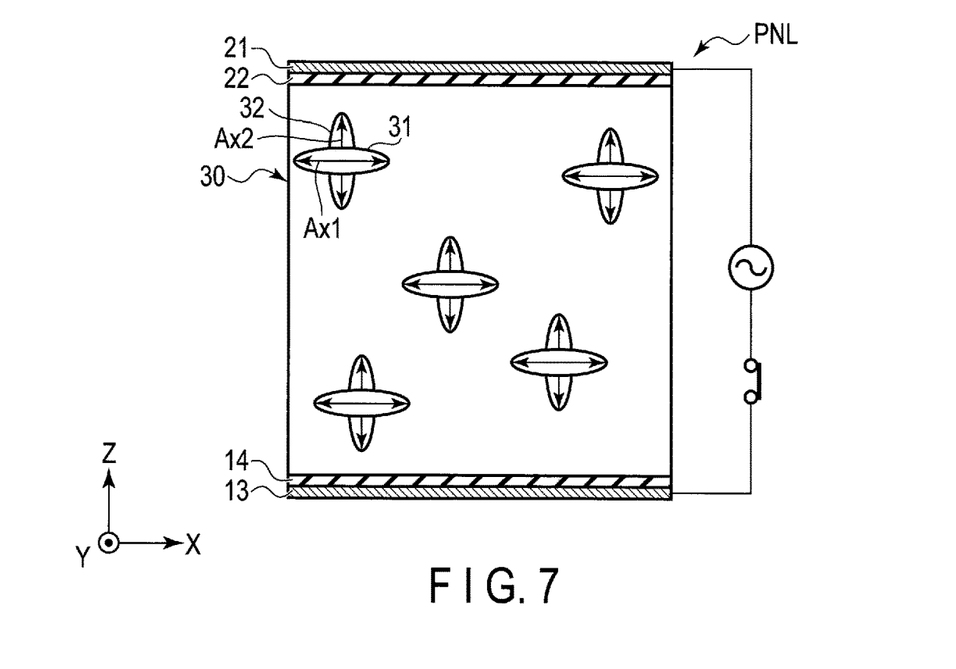
FIG. 7 is a schematic view showing the liquid crystal layer 30 in an on state.

FIG. 7 is a schematic view showing the liquid crystal layer 30 in an on state. The on state corresponds to a state in which voltage is applied to the liquid crystal layer 30 (for example, a state in which the potential difference between the pixel electrode 13 and the common electrode 21 is greater than or equal to a threshold value). As described above, the responsivity of the polymer 31 to an electric field is lower than the responsivity of the liquid crystal molecule 32 to an electric field. For example, the alignment direction of the polymer 31 hardly changes regardless of whether an electric field exists or not. On the other hand, the alignment direction of the liquid crystal molecule 32 changes in accordance with an electric field when high voltage which is greater than the threshold value is applied to the liquid crystal layer 30. That is, as illustrated in the drawing, the optical axis Ax1 is substantially parallel to the first direction X, whereas the optical axis Ax2 is inclined with respect to the first direction X. If the liquid crystal molecules 32 are positive liquid crystal molecules, the liquid crystal molecules 32 are aligned such that major axes thereof extend along an electric field. The electric field between the pixel electrode 13 and the common electrode 21 is formed in the third direction Z. Therefore, the liquid crystal molecules 32 are aligned such that major axes thereof or the optical axes Ax2 extend in the third direction Z. That is, the optical axis Ax1 and the optical axis Ax2 intersect each other. Therefore, a large refractive index difference exists between the polymer 31 and the liquid crystal molecule 32 in all directions including the first direction X, the second direction Y and the third direction Z.

Figure 8:
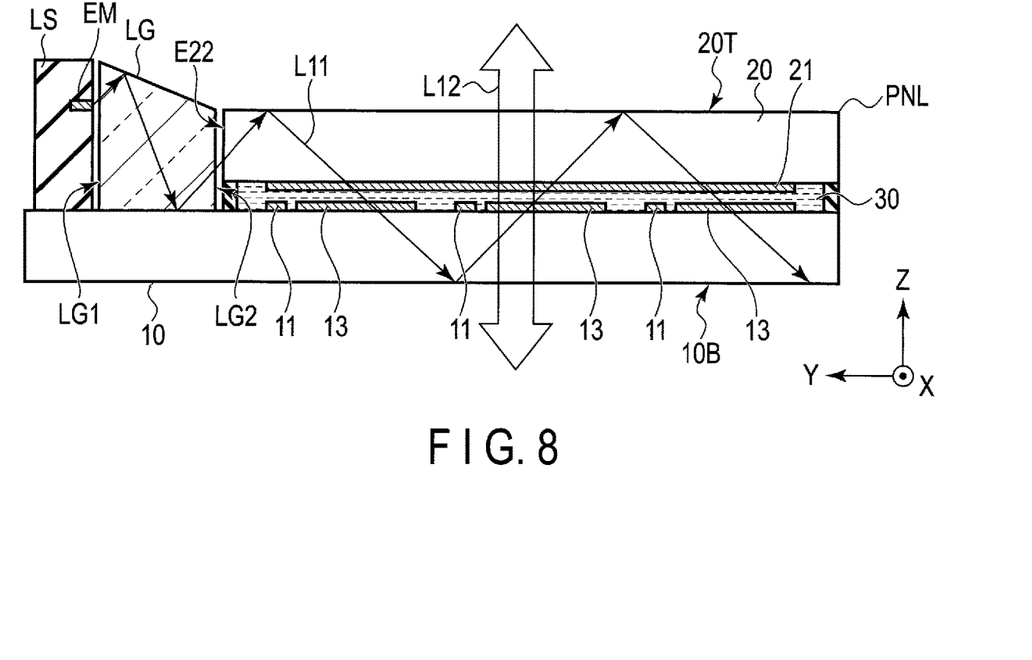
FIG. 8 is a cross-sectional view showing the display panel PNL in a case where the liquid crystal layer 30 is in the off state.

FIG. 8 is a cross-sectional view showing the display panel PNL in a case where the liquid crystal layer 30 is in the off state. A light beam L11 emitted from the light-emitting element LS is made incident on the light guide LG from the first surface LG1, propagates to the second surface LG2, is made incident on the display panel PNL from the end portion E22 and propagates through the transparent substrate 20, the liquid crystal layer 30, the transparent substrate 10 and the like. If the liquid crystal layer 30 is in the off state, the light beam L11 is transmitted and hardly scattered in the liquid crystal layer 30. The light beam L11 propagates through the display panel PNL and hardly leaks from a lower surface 10B of the transparent substrate 10 and an upper surface 20T of the transparent substrate 20. That is, the liquid crystal layer 30 is in a transparent state.

External natural light L12 which is made incident on the display panel PNL is transmitted and hardly scattered in the liquid crystal layer 30. In other words, the natural light L12 made incident on the display panel PNL from the lower surface 10B is transmitted through the upper surface 20T, and the natural light L12 made incident on the display panel PNL from the upper surface 20T is transmitted through the lower surface 10B. For this reason, when the user observes the display panel PNL from the upper surface 20T side, the user can visually recognize a background on the lower surface 10B side through the display panel PNL. Similarly, when the user observes the display panel PNL from the lower surface 10B side, the user can visually recognize a background on the upper surface 20T side through the display panel PNL.

Figure 9:
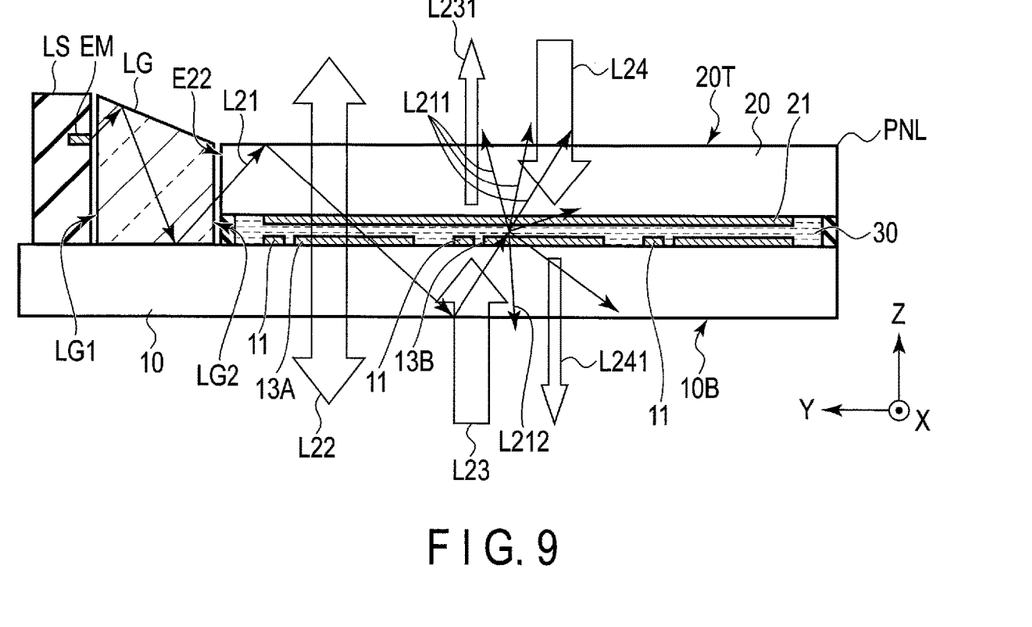
FIG. 9 is a cross-sectional view showing the display panel PNL in a case where the liquid crystal layer 30 is in the on state.

FIG. 9 is a cross-sectional view showing the display panel PNL in a case where the liquid crystal layer 30 is in the on state. A light beam L21 emitted from the light-emitting element LS is made incident on the light guide LG from the first surface LG1, propagates to the second surface LG2, is made incident on the display panel PNL from the end portion E22 and propagates through the transparent substrate 20, the liquid crystal layer 30, the transparent substrate 10 and the like. In the example illustrated, the liquid crystal layer 30 overlapping a pixel electrode 13A is in the off state and the liquid crystal layer 30 overlapping a pixel electrode 13B is in the on state. For this reason, the light beam L21 is transmitted and hardly scattered in an area of the liquid crystal layer 30 which overlaps the pixel electrode 13A, and the light beam L21 is scattered in an area of the liquid crystal layer 30 which overlaps the pixel electrode 13B. Of the light beam L21, some scattered light beams L211 are transmitted through the upper surface 20T, some scattered light beams L212 are transmitted through the lower surface 10B, and the other scattered light beams propagate through the display panel PNL.

In the area overlapping the pixel electrode 13A, natural light L22 made incident on the display panel PNL is transmitted and hardly scattered in the liquid crystal layer 30 similarly to the natural light L12 shown in FIG. 7. In the area overlapping the pixel electrode 13B, when natural light L23 is made incident from the lower surface 10B, part of the natural light L23 is scattered in the liquid crystal layer 30 and part of the natural light L23, namely, light L231 is transmitted through the upper surface 20T. In addition, when natural light L24 is made incident from the upper surface 20T, part of the natural light L24 is scattered in the liquid crystal layer 30 and part of the natural light L24, namely, light L241 is transmitted through the lower surface 10B. For this reason, when the user observes the display panel PNL from the upper surface 20T side, the user can visually recognize the color of the light beam L21 in the area overlapping the pixel electrode 13B. In addition, since the light L231 is transmitted through the display panel PNL, the user can visually recognize the background on the lower surface 10B side through the display panel PNL. Similarly, when the user observes the display panel PNL from the lower surface 10B side, the user can visually recognize the color of the light beam L21 in the area overlapping the pixel electrode 13B. In addition, since the light L241 is transmitted through the display panel PNL, the user can visually recognize the background on the upper surface 20T side through the display panel PNL. In the area overlapping the pixel electrode 13A, since the liquid crystal layer 30 is in the transparent state, the user hardly recognize the color of the light beam L21 and the user can visually recognize the background through the display panel PNL.

Next, another configuration example of the present embodiment will be described.

Figure 10:
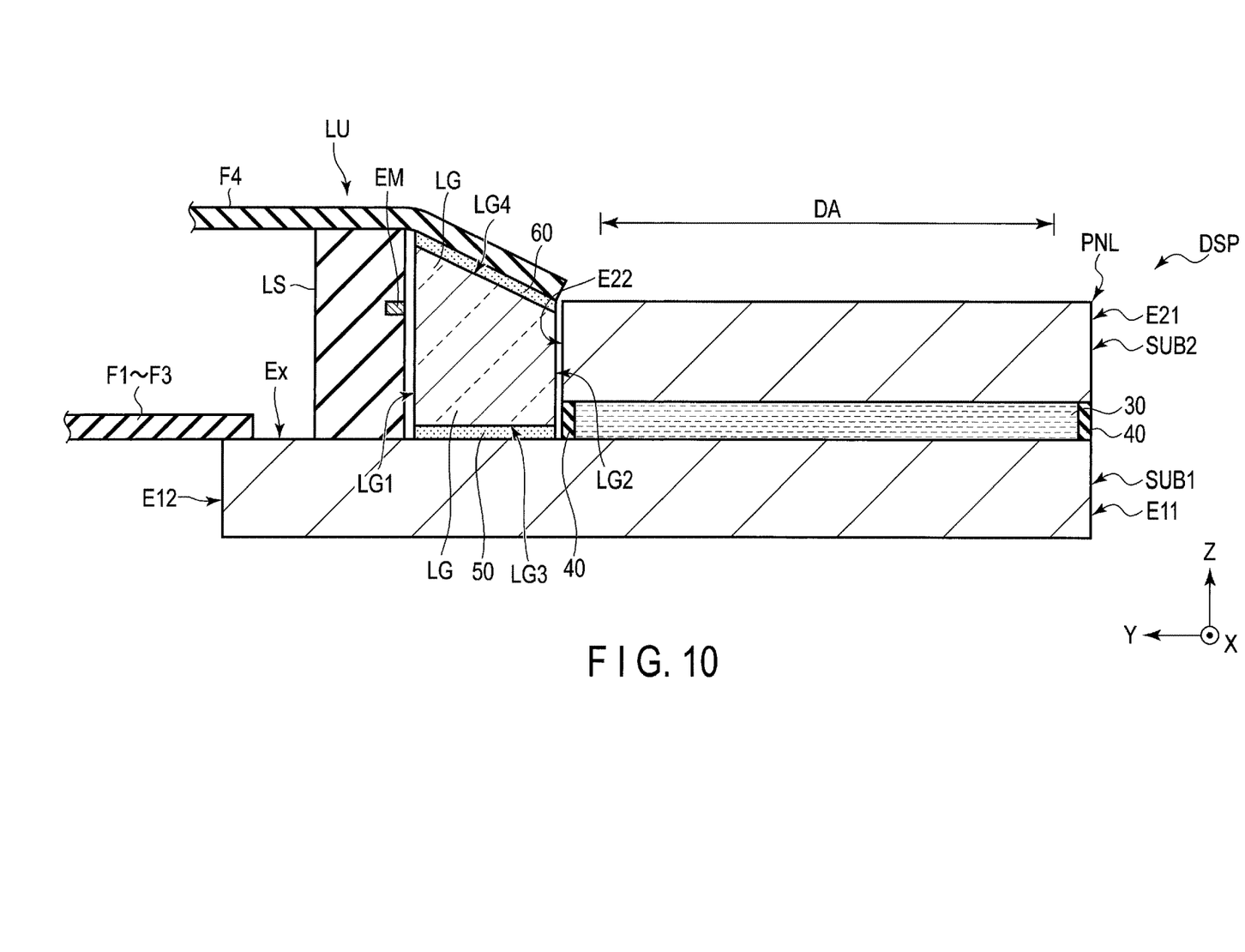
FIG. 10 is a cross-sectional view showing another configuration example of the display device DSP.

FIG. 10 is a cross-sectional view showing another configuration example of the display device DSP. The configuration example of the display device DSP shown in FIG. 10 differs from the configuration example of the display device DSP shown in FIG. 3 in that the wiring substrate F4 and the light guide LG are bonded together via an adhesive layer 60 located between the wiring substrate F4 and the fourth surface LG4. In the example illustrated, the light guide LG is also bonded to the first substrate SUB1 with the adhesive layer 50. At least one of the adhesive layers 50 and 60 may include a reflective layer. Since the wiring substrate F4 is bonded to the light guide LG, the light-emitting unit LU can be fixed to the first substrate SUB1 without interposition of an adhesive layer between the light-emitting element LS connected to the wiring substrate F4 and the first substrate SUB1.

According to this configuration example, advantages similar to those of the above-described configuration example can be achieved. In addition, the height EMH of the light emitting portion EM can be reduced as compared to a case where an adhesive layer is located between the light-emitting element LS and the first substrate SUB1. For this reason, the thickness of the display panel PNL can be reduced. In addition, since the fourth surface LG4 is covered with the wiring substrate F4, the degradation of visual quality caused by stray light resulting from leaking light from the fourth surface LG4 can be suppressed.

Figure 11:
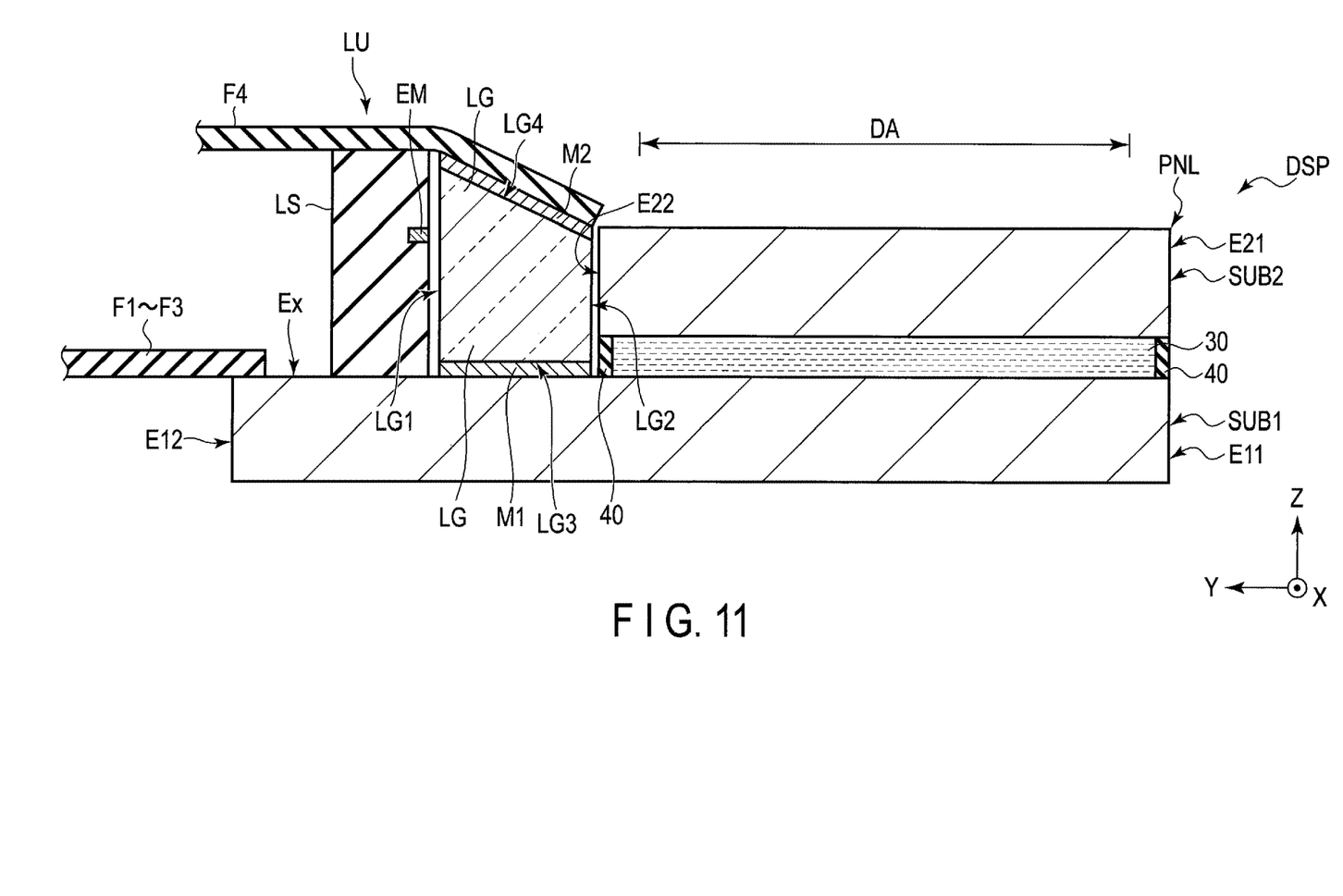
FIG. 11 is a cross-sectional view showing another configuration example of the display device DSP.

FIG. 11 is a cross-sectional view showing another configuration example of the display device DSP. The configuration example of the display device shown in FIG. 11 differs from the configuration example of the display device DSP shown in FIG. 10 in that a first reflective layer M1 is formed on the third surface LG3 and a second reflective layer M2 is formed on the fourth surface LG4.

In one example, the first reflective layer M1 and the second reflective layer M2 are formed of a metal material having a high reflectance such as aluminum, silver, titanium or silver. The first reflective layer M1 and the second reflective layer M2 may be formed on the third surface LG3 and the fourth surface LG4, respectively, by vapor deposition, coating or printing or may be formed on the third surface LG3 and the fourth surface LG4, respectively, by attaching a separately-formed thin film or the like. In addition, the first reflective layer M1 and the second reflective layer M2 may have a multilayer structure in which an adhesive, a reflective thin film and an adhesive are stacked in this order. The first reflective layer M1 and the second reflective layer M2 may be formed entirely on the third surface LG3 and the fourth surface LG4, respectively, or may be formed partly on the third surface LG3 and the fourth surface LG4, respectively.

The second reflective layer M2 and the wiring substrate F4 are in contact with each other in the example illustrated, but if wiring lines are formed on a surface of the wiring substrate F4 which is opposed to the second reflective layer M2, the wiring substrate F4 should preferably be away from the second reflective layer M2. In addition, if the wiring substrate F4 is in contact with the second reflective layer M2, an insulating layer is interposed between the wiring substrate F4 and the second reflective layer M2.

According to this configuration example, advantages similar to those of the above-described configuration example can be achieved. In addition, the light leaking from the third surface LG3 and the fourth surface LG4 can be suppressed, and the light reflection efficiency of the third surface LG3 and the fourth surface LG4 can be improved and the light usage efficiency can be improved. Only one of the first reflective layer M1 and the second reflective layer M2 may be provided in the light guide LG instead.

As described above, a display device capable of suppressing the degradation of display quality can be provided by the present embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a first substrate;
   a second substrate opposed to the first substrate and including an end portion;
   a liquid crystal layer provided between the first substrate and the second substrate and including a polymer in a shape of a streak and a liquid crystal molecule;
   a light-emitting element having a light emitting portion opposed to the end portion; and
   a light guide located between the end portion and the light emitting portion, wherein
   the second substrate is formed of transparent glass,
   the light guide is formed of transparent resin,
   air layers are interposed between the light-emitting element and the light guide and between the light guide and the second substrate, respectively,
   the light guide includes a first surface opposed to the light emitting portion, a second surface opposed to the end portion, a third surface and a fourth surface which are located between the first surface and the second surface,
   the first surface and the second surface are located between the light emitting portion and the end portion,
   the third surface is opposed to the first substrate,
   the fourth surface is located on a side opposite to the third surface and is inclined with respect to the third surface,
   the third surface is bonded to the first substrate,
   the first surface has a first height,
   the second surface has a second height, and
   the first height is greater than the second height.

2. The display device of claim 1, wherein the fourth surface is inclined at an angle of less than or equal to 15° with respect to the third surface.

3. The display device of claim 1, wherein an upper end portion of the first surface is farther from the first substrate than the light emitting portion is.

4. The display device of claim 1, wherein an upper end portion of the first surface is farther from the first substrate than an upper surface of the second substrate is.

5. The display device of claim 1, further comprising a wiring substrate electrically connected to the light-emitting element, wherein
the light-emitting element and the light guide are provided between the first substrate and the wiring substrate.

6. The display device of claim 5, wherein the fourth surface is bonded to the wiring substrate.

7. The display device of claim 6, wherein at least one of an adhesive layer between the third surface and the first substrate and an adhesive layer between the fourth surface and the wiring substrate includes a reflective layer.

8. The display device of claim 1, further comprising a first reflective layer formed on the third surface and a second reflective layer formed on the fourth surface.

9. The display device of claim 1, wherein the light-emitting element, the light guide and the second substrate are arranged in this order and are located on a same side of the first substrate.

\* \* \* \* \*